United States Patent Office 3,390,046
Patented June 25, 1968

3,390,046
MODIFIED ROSIN OILS AND
THEIR USE IN PAPER
William D. McDavid, Pensacola, Fla., assignor to Tenneco Chemicals, Inc., a corporation of Delaware
No Drawing. Filed Apr. 29, 1965, Ser. No. 451,965
8 Claims. (Cl. 162—180)

ABSTRACT OF THE DISCLOSURE

Rosin oil having an acid value of 70 to 130 is reacted with an aliphatic α,β-unsaturated acid having 1 to 3 carboxylic groups, such as maleic anhydride or fumaric acid, to form a modified rosin oil that has an acid value of 150 to 290. Alkali metal soaps of the modified rosin oils can be used alone or in combination with rosin soaps in the sizing of paper.

---

The present invention relates to novel derivatives of rosin oil, compositions containing such derivatives, and the use of these derivatives in the sizing of paper.

Rosin oil is an oil essentially composed of rosin acids and decarboxylated rosin acids. Rosin oil is formed as a by-product in the production or purification of rosin such as wood rosin or tall oil rosin. This oil also is formed as a by-product when disproportionating rosin as well as when rosin is heated for other purposes. As the name indicates, rosin oil is an oily liquid and while some uses have been found for this material, it cannot be used in place of rosin for sizing paper or for most other purposes where rosin and/or its soaps are used.

It has been discovered that rosin oil can be reacted with maleic anhydride to form a solid product which may be used to replace rosin for many purposes including replacing rosin, in whole or in part, in the sizing of paper. The modified rosin oils may be used for many purposes for which rosin oil is unsatisfactory.

While rosin oil is essentially composed of rosin acids and decarboxylated rosin acids, it may contain other materials, hereinafter referred to as "impurities." For present purposes rosin oils containing less than 10% by weight of such impurities are preferred. The ratio of rosin acids to decarboxylated rosin acids may vary over a wide range but preferably the oil should contain from 35% to 70% of decarboxylated rosin acids based on the total weight. Useful rosin oils are those having an acid value in the range of from 70 to 130 and preferably in the range of from 80 to 120. While the terms "rosin acids" and "decarboxylated rosin acids" are used as is customary, it is realized that rosin oils are usually produced as a result of heating and that both types of products may vary to a certain extent as a result of temperature differences. Decarboxylated rosin acids are neutral and largely hydrocarbon in nature. The rosin acids do go through some rearrangement and isomerization, and possibly other changes, as the result of the heat treatment involved in the production of rosin oil.

While the modified rosin oils of the present invention may be used for many purposes, a particular use is in the production of sizes. The amount of maleic anhydride combined with the rosin will depend to a certain extent upon the intended use. In general, the amount of maleic anhydride reacted with the rosin oil is such that the modified rosin oil will have an acid value in the range of 150–290. For the sizing of paper, it had been found that a small amount of maleic anhydride, for example, as little as 3%, will materially improve the properties of the rosin oil when used as size. However, about 8%–25% of maleic anhydride is preferred with about 15% being optimum under most conditions. The amount of maleic anhydride used is influenced to some extent by the particular rosin oil used but, in general, the amount of maleic anhydride reacted with the rosin oil should be sufficient to raise the acid value to at least 150 and preferably into the range of 190–290. Below acid value 150 the maleated rosin oil is less efficient in the sizing of paper but is better than unmodified rosin oil. Increasing the acid number above 290 tends to reduce the sizing efficiency.

Maleic acid or maleic anhydride are preferred for modifying rosin oils when the product is to be used in the production of paper size. However, fumaric acid may be used to produce almost equal results. While the foregoing acidic compounds are preferred, it is to be understood that other aliphatic, alpha-beta unsaturated acids containing from 1 to 3 carboxylic groups may be used. These acids contain the group,

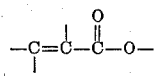

Mixtures of any of the aforesaid acids or the anhydrides of such acids may be used. In general, such acids will contain from 3 to 7 carbon atoms and from 4 to 12 hydrogen atoms including such acids in which at least one of the hydrogen atoms is replaced by a chlorine or bromine atom. Illustrative acid compounds include acrylic acid, 2-chloropropenoic acid, 3-chloropropenoic acid, bromomaleic acid, chloromaleic acid, methacrylic acid, sorbic acid, aconitic acid, itaconic acid, citraconic acid, and the like; the anhydrides of such acids; and mixtures thereof.

The rosin oil and alpha-beta unsaturated acid may be reacted in any suitable manner. For example, the rosin oil, preferably substantially anhydrous, may be mixed with the maleic anhydride and held at an elevated temperature until the reaction is substantially complete as determined by analysis for unreacted maleic anhydride. The ingredients can be readily reacted at a temperature in the range of 180°–250° C., preferably in the range of 190°–230° C. The particular temperature used does not seem to materially change the characteristics of the product and rosin oil may be maleated with maleic anhydride or fumarized with fumaric acid under similar conditions. The other alpha-beta unsaturated acids may be reacted with the rosin oil in a similar manner, it being understood that the temperature conditions may be varied as necessary. The reaction should be carried substantially to completion and the modified rosin oil should contain less than 3% and preferably less than 1% by weight of free modifying acid.

As used herein, the "acid value" is the effective acid value and may be determined in an acetone-water solution. A sample of the modified rosin oil can be dissolved in an 80% acetone-20% water solution containing an indicator, phenolphthalein, and titrated with aqueous potassium hydroxide solution to determine the acid value.

The maleated, fumarized, or other acid-modified rosin oil may be used alone in the production of sizes or may be mixed with rosin which may be wood rosin, tall oil rosin, disproportionated rosin, polymerized rosin, or rosin reacted with maleic or fumaric acid and/or formaldehyde. When both the modified rosin oil and a rosin are used, the rosin may constitute up to 95% by weight of these two materials. The sizes are prepared by saponifying the modified rosin oil, either alone or with a rosin, to form the sodium or potassium salts in substantially the same manner as rosin sizes normally are prepared. The modified rosin oil preferably is warmed and melted and usually is mixed with an aqueous solution of a sodium or potassium compound, such as sodium or potassium hydroxide or carbonate. The amount and concentration of alkaline solution usually is such that the resulting liquid, aqueous size contains from 60% to 80% size solids by weight and has an acid number in the range of 0–50 and preferably an acid number below 40. If desirable, the size may be dried and redissolved before use. The dried size may have an acid number of up to 83 and preferably below 66, depending upon the degree of saponification.

The novel sizes of the present invention may be used in the same manner as ordinary rosin sizes by adding an aqueous solution of the size to an aqueous suspension of papermaking cellulose fibers, precipitating the size on the fibers with alum, sheeting the fibers, and drying the web to form paper. The amount of size may be varied widely depending upon the results obtained but, in general, the amount of size will be between ¼% and 5% and usually between 1% and 4%, based on the dry weight of fibers. If the size includes the soaps of both modified rosin oil and rosin, then the amount used will be, in general, the total amount of these two ingredients.

Example 1

The following procedure is illustrative of the preparation of maleated rosin oil. Fumarized rosin oil and other modified rosin oils may be prepared by the same general procedure.

Two thousand two hundred and fourteen gallons of rosin oil (Acid No. 120) was dehydrated at 190° C. until it contained 0.07% moisture as the presence of moisture tends to interfere with the reaction. After dehydration the addition of maleic anhydride was started. First, 500 pounds of maleic anhydride was added with stirring and exothermic heat raised the temperature to 230° C. The mixture was cooled to 190° C. and 2090 pounds of maleic anhydride was gradually added. The temperature was held at 190° C. for 3 hours and then gradually increased to 230° C. and held at this temperature for about 9 hours. The modified rosin was then cooled. The product has an acid value of 222 and contained 1.05% unreacted maleic.

Example 2

A series of sizes were prepared from rosin oils modified with varying amounts of maleic anhydride and from B rosin. These aqueous paste sizes (sodium salts) contained about 70% solids and had acid values of about 15. Paper hand sheets were prepared and tested by standard laboratory procedures. A 50:50 blend of pine and semi-chemical hardwood pulp was beaten to a Canadian Standard Freeness of 600 at 2.5% consistency with water adjusted to pH 4.5 with sulfuric acid. To this pulp there was added in increments diluted paste size and papermakers alum to provide a level of 1% size and 1½% alum. The final pulp was adjusted to pH 4.5 with sulfuric acid. The hand sheets were made in a Noble and Wood hand sheet machine using recycle water at pH 4.5 for dilution so that each 8-inch by 8-inch sheet weighed 2.5 grams, dry basis. The sheets were pressed and dried and conditioned at 90° F. and 40% relative humidity for at least two hours.

Conditioned hand sheets were tested for acidic ink penetration on a Model 320-Z Fotosize Penetration Tester available from Thwing-Albert Instrument Company. This tester is a null balance indicator of the amount of light reflected from the under surface of the paper before and after application of the ink. The measure of penetration is shown by the loss of reflectivity of the under surface. The results are expressed in seconds, the length of time required to reduce the reflectivity of the under surface a standard amount as measured by photoelectric cells. Thus, the longer the period, the greater the resistance to penetration.

The results are set forth in the following table. Under "Size" is listed the material saponified to form the size. The "Acid No." following the rosin oils is the acid number of the oil prior to saponification.

TABLE I

| Size | Maleic Anhydride, percent | Penetration, seconds |
|---|---|---|
| Rosin Oil A (Acid No. 100) | 0 | 3 |
| Rosin Oil B (Acid No. 84) | 0 | 3 |
| Rosin Oil A | 3 | 12 |
| Do | 6 | 21 |
| Rosin Oil B | 8 | 30 |
| B Rosin | 0 | 19 |

The rosin oil modified with 6% combined maleic anhydride had a size efficiency equal to the B rosin.

Example 3

A series of sizing tests using various sizes were carried out on conditioned hand sheets prepared in the manner described in Example 2 except the pulp was beaten to Canadian Standard Freeness of 325 and the sizing was at a level of 1% size solids and 1.5% alum, based on the weight of pulp (dry basis). For comparative purposes, Sizes A and B were commercial fortified sizes purchased on the open market and promoted as "super-sizes." These commercial, aqueous sodium soap sizes had 13–17 Acid No. and contained 68%–72% size solids. Size C was prepared from heat-treated wood rosin fortified with 4% maleic anhydride. Sizes D, E, and F were samples taken from separate large tanks of size, each prepared by saponifying a blend of equal amounts of maleated rosin oil produced by reacting rosin oil with 15% maleic anhydride in the manner described in Example 1 and pale wood rosin reacted with 10% fumaric acid. The maleated rosin oil had Acid No. 197 and the fumarized rosin had Acid No. 240. Sizes D, E, and F were prepared by saponifying the maleated rosin oil and fumarized rosin with aqueous sodium hydroxide to form the paste sizes having an Acid No. 13–17 and containing 68%–72% size solids.

The hand sheets were subjected to the Fotosize Test as described in Example 2 and also to the Cobb, Penescope, and Ink Flotation Tests. In the Cobb Test, TAPPI Method No. T 441 M–60, the results are expressed as grams of water absorbed per 100 sq. cm. In the well-known Ink Flotation Test pieces of paper (boats) were floated felt-side up on a level bath of blue-black ink. The results are expressed as the number of seconds elapsing until one-half the sheet was penetrated by ink. In the Penescope Test the paper sheet was clamped in position on the side of the Penescope cell. The liquid behind the felt side of the sheet was 20% lactic acid at 90° C. The indicator brushed on the wire side of the sheets was methyl orange. The results are expressed as the number of seconds required for the ink to penetrate through the paper (not through a pin hole) as shown by the change of the indicator to a pink color. In each of these tests, except the Cobb Test, the higher figures indicate the better results.

TABLE II

| Size | Fotosize (sec.) | Cobb, gms./100 cm.$^2$ | Penescope (sec.) | Flotation (sec.) |
|---|---|---|---|---|
| A | 55 | .2611 | 92 | 256 |
| B | 59 | .2633 | 110 | 260 |
| C | 24 | .2608 | 84 | 113 |
| D | 55 | .2606 | 95 | 259 |
| E | 47 | .2623 | 96 | 196 |
| F | 49 | .2620 | 105 | 215 |

The results obtained with the sizes from the blends of fumarized rosin and maleated rosin oil (D, E, and F) were better than those obtained with the fortified rosin size (C) and compared favorably in many respects with the results obtained with the commercial "super-sizes" (A and B).

The terms and expressions which have been employed are used as terms of description and not of limitation, and there is no intention in the use of such terms and expressions of excluding any equivalents of the features shown and described or portions thereof, but it is recog-

What is claimed is:

1. Maleated rosin oil essentially comprising rosin oil having an original acid value in the range of 70–130, and being chemically combined with maleic anhydride in an amount such that the modified rosin oil has an acid value in the range of 190–280.

2. Maleated rosin oil essentially comprising rosin oil containing from 35% to 70% rosin acids and having an original acid value in the range of 70–130, and being chemically combined with fumaric acid in an amount such that the modified rosin oil has an acid value in the range of 150–290.

3. Paper comprising a water-laid web of cellulosic material carrying alum-precipitated size in an amount in the range of from ¼% to 5% by weight of the fibers on a dry basis, said size being the alkali metal saponification product of material comprising from 0% to 95% of a rosin with the remainder of said material being maleated rosin oil essentially comprising rosin oil having an original acid value in the range of 70–130 that has been chemically combined with maleic anhydride in an amount such that the modified rosin oil has an acid value in the range of 190–290.

4. Paper comprising a water-laid web of cellulosic material carrying alum-precipitated size in an amount in the range of from ¼% to 5% by weight of the fibers on a dry basis, said size being the alkali metal saponification product of material comprising from 0% to 95% of a rosin with the remainder of said material being fumarized rosin oil essentially comprising rosin oil having an original acid value in the range of 70–130, and being chemically combined with fumaric acid in an amount such that the modified rosin oil has an acid value in the range of 190–280.

5. In the method of manufacturing sized paper from a water-laid web of cellulosic fibers comprising forming a dilute aqueous dispersion of size, precipitating the size on the fibers with alum, sheeting the fibers to form a web, and drying said web, the improvement wherein said size comprises the alkali metal saponification product of maleated rosin oil essentially comprising rosin oil having an original acid value in the range of 70–130, and being chemically combined with maleic anhydride in an amount such that the modified rosin oil has an acid value in the range of 190–280.

6. In the method of manufacturing sized paper from a water-laid web of cellulosic fibers comprising forming a dilute aqueous dispersion of size, precipitating the size on the fibers with alum, sheeting the fibers to form a web, and drying said web, the improvement wherein said size comprises the alkali metal saponification product of material comprising from 0% to 95% of a rosin and from 5% to 100% of maleated rosin oil essentially comprising rosin oil having an original acid value in the range of 70–130, and being chemically combined with maleic anhydride in an amount such that the modified rosin oil has an acid value in the range of 190–280.

7. Modified rosin oil consisting essentially of rosin oil having an original acid value in the range of 70–130 that has been chemically combined with an aliphatic, α, β-unsaturated acid having 3 to 7 carbon atoms and 1 to 3 carboxylic groups in an amount such that the modified rosin oil has an acid value in the range of 150–290.

8. Paper comprising a water-laid web of cellulosic material carrying alum-precipitated size in an amount in the range of from ¼% to 5% by weight of the fibers on a dry basis, said size being the alkali metal saponification product of material comprising from 0% to 95% of a rosin with the remainder of said material being modified rosin oil essentially comprising rosin oil having an original acid value in the range of 70–130 that has been chemically combined with an aliphatic, α,β-unsaturated acid having 3 to 7 carbon atoms and 1 to 3 carboxylic groups in an amount such that the modified rosin oil has an acid value in the range of 150–290.

References Cited

UNITED STATES PATENTS 2,771,464   11/1956   Hastings _____ 162—180

S. LEON BASHORE, *Primary Examiner.*